United States Patent [19]
Barnes

[11] 3,983,928
[45] Oct. 5, 1976

[54] DUAL TEMPERATURE THERMOSTATIC CONTROLLER

[76] Inventor: Robert W. Barnes, 108 Deep Dale Drive East, Levittown, Pa. 19056

[22] Filed: Oct. 15, 1974

[21] Appl. No.: 514,302

[52] U.S. Cl. .................................. 165/12; 236/47; 236/68 B
[51] Int. Cl.² ..................................... G05D 23/30
[58] Field of Search ..................... 236/46, 47, 68 B; 337/302–304; 165/12

[56] References Cited
UNITED STATES PATENTS

| | | | |
|---|---|---|---|
| 2,611,855 | 9/1952 | Turner | 219/511 |
| 3,538,307 | 11/1970 | Birdwell | 219/341 |
| 3,834,618 | 9/1974 | Buckwalter | 236/46 |

*Primary Examiner*—William E. Wayner
*Attorney, Agent, or Firm*—Florence U. Reynolds

[57] ABSTRACT

A timer-controlled thermostat, being set for a lower room temperature, actuates a miniature heating element beneath and in close proximity to an existing thermostat that controls the heating system in a building. The heat radiated from the miniature heating element shuts down the existing building thermostat until the room temperature drops below the temperature at which the timer-controlled thermostat is set, whereupon the miniature heating element is de-energized and the building thermostat senses the lower room temperature and turns the building heating system back on. This cycling continues throughout the timed period. Control of an air conditioning system is accomplished by inserting a controlled relay box between the wall power receptacle and a plug-in type air conditioner power cord, or by incorporating a thermoelectric cooler to produce a cooling effect to control the thermostat used in a central air conditioning system.

3 Claims, 4 Drawing Figures

DUAL TEMPERATURE THERMOSTATIC CONTROLLER

BACKGROUND OF THE INVENTION

Field of the Invention

This invention relates to a dual temperature thermostatic controller for use in a house, apartment, business establishment or other dwelling, as a means of minimizing waste of heating fuel or air conditioner electricity, when the user leaves his home, business establishment, or other dwelling unoccupied for extended periods of time. Typical examples are times when the user is away at work, or shopping, etc., or when the user leaves his business establishment for closing-hours, or other reasons. It will control and maintain a "second", and more economical, preselected room temperature (cooler in winter, or warmer in summer) during the time the user is gone, and will automatically restore the room temperature to a "normal" comfortable level at a pre-set time before the user returns to the dwelling. It also serves as a "comfort" product for users who desire to sleep in a cool room in winter, and would like the room temperature to warm-up at a pre-set time before arising from bed. Maintaining a second temperature operation is also a safety feature to prevent possible household water-line freeze-ups in winter, or excessive interior dwelling heat in summer (as opposed to the risks of simply turning off the heating or air conditioning systems when leaving for extended periods). This feature also provides protection for small children, invalids, pets, and the like, who may be left unattended for long periods of time unintentionally.

Prior Art

A dual temperature thermostat was described in U.S. Pat. No. 1,720,723 and consisted of two separate bi-metallic thermostats in one casing, and clock actuated, for day/night operation, to be used as a primary thermostat in a dwelling. Later patents covered mechanical and electrical variations thereof, including using one bi-metallic or thermal element, with two mechanical stops in place of using dual elements.

This type of device, or variation thereof, usually requires disconnecting and removal of the existing thermostat (physically substituting the new device in its place), and is normally attempted by an experienced heating system installer or electrician. Otherwise, this type of controller is installed as part of an original heating system installation. Either installation is normally not attempted by the average household user who has no prior knowledge of heating or air conditioning systems. Also, apartment renters may be prohibited from making such installation.

SUMMARY OF THE INVENTION

The object of this invention is to provide a "retro-fit" device which will, in effect, convert the existing dwelling thermostat(s) and/or plug-in air conditioner(s) into an inexpensive pre-set, time-programmed, 2-temperature control system for both Winter or Summer operations. It is designed for the ordinary household consumer, and does not require any special installation, removal of thermostats, additions or changes to house wiring, or any prior knowledge of heating and air conditioning systems.

This invention is essentially a timer and thermostat system, capable of altering and programming the operation of building heater thermostats for pre-set intervals of time. To control an existing building heater thermostat, without any physical wiring to the thermostat or heating system, the device turns-on a miniature heating element beneath and in close proximity to the thermostat, which drives the thermostat up to 85°–90° F., thereby shutting off the building heating system. At a pre-set lower temperature cotrolled by the device, the heating element under the thermostat shuts-off, allowing the thermostat to turn "back-on". When the room temperature rises above the "pre-set lower temperature", the device will again turn on the heating element under the thermostat, shutting-off the thermostat. This cycle will continue, and will maintain this preselected lower temperature, until the device's internal-timer disengages the device at a pre-set hour, thereby allowing the building thermostat to resume normal operation and maintain it's pre-set higher room temperature.

A similar, but reversed, function is provided to control plug-in types of air conditioners. The timed "second" temperature is maintained by making and breaking the household electric current at the point where the air conditioner is plugged-in, and is accomplished by inserting a plug-in type relay box between the wall socket and the air conditioner plug.

An electronic; semi-conductor; or bi-metallic type of thermo-cooler can be incorporated in the device, as a replacement or expansion on the above described method for controlling the user's air conditioning system. The cooling device, along with the Heating Element, can be installed in close proximity to an "all-season" type of building thermostat, or by itself near a remote air conditioner thermostat, as a means of controlling the air conditioning system. Although the device is especially designed to be installed as a "retrofit" to the existing heating and cooling systems in a given building, the unit can be used as an aid in planning new heating or cooling system installations, variations, or additions.

DETAILED DESCRIPTION OF THE DRAWINGS

Figure 1:
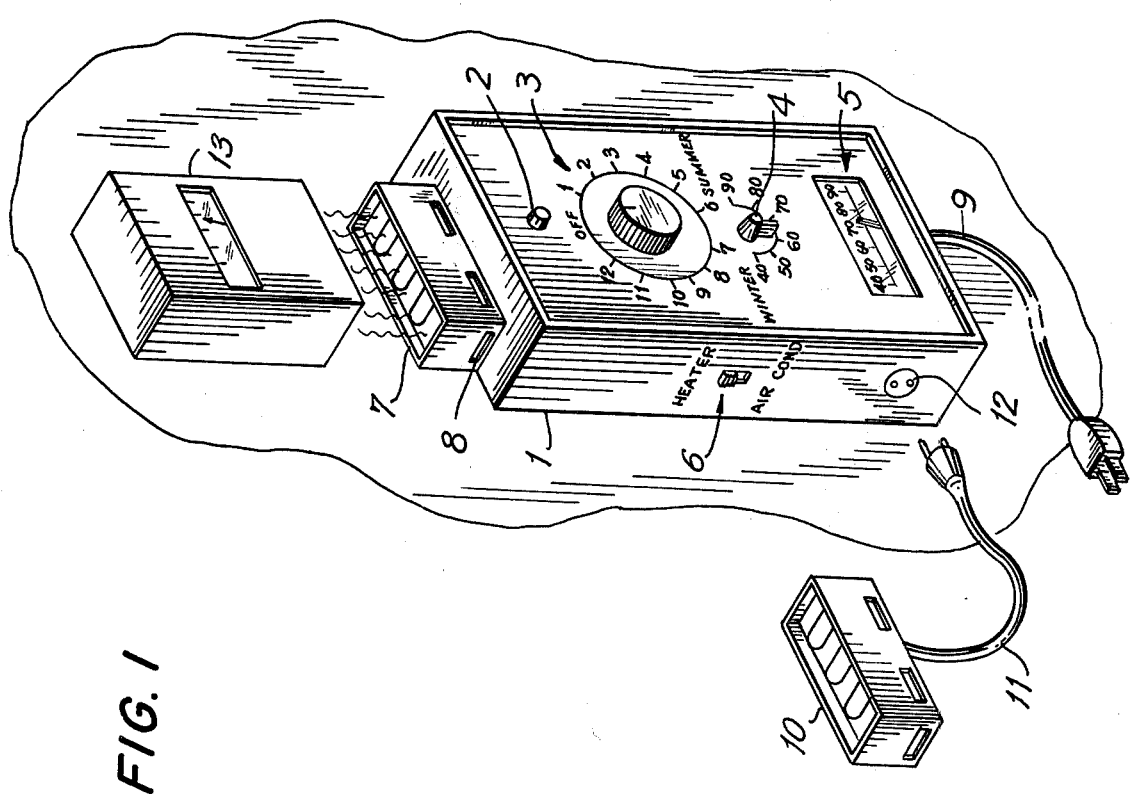
FIG. 1 is an isometric drawing of a dual temperature thermostatic controller comprising a control box with built-in heating element in close proximity to an existing building thermostat. Also shown is an auxiliary heating element to control a remotely located or additional thermostat.

In FIG. 1, the control box 1 is provided with a neon pilot lite 2, a timer control switch 3 (for settings in hours), a temperature set control switch 4, a true temperature indicator 5, a Heater-Air. Cond. switch 6, an exposed electric heating element 7 with air flow louvres 8, and a power cord 9 to connect the control box 1 to a source of electric power (not shown). An auxiliary heating element 10 may be connected to the control box 1 by means of an interconnect cable 11 and plugged into an auxiliary socket 12 on the control box 1. The heating element 7 is below and in close proximity to an existing household thermostat 13.

Figure 2:
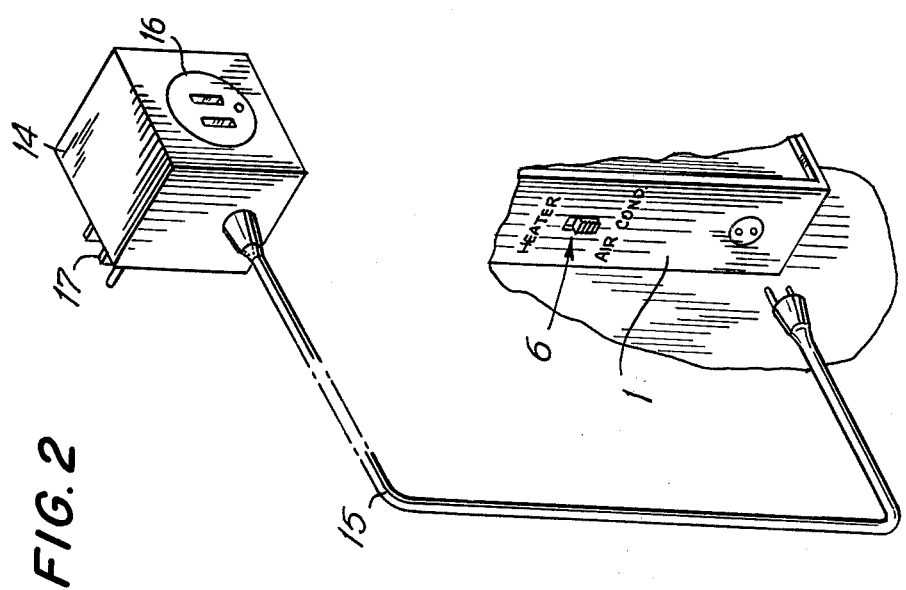
FIG. 2 is an isometric drawing of an air conditioner relay box which may be inserted between the control box of FIG. 1 and a plug-in type air conditioner.

FIG. 2 shows the air cond. relay box 14, with its interconnect cable 15, and where it plugs into the control box 1. On the air cond. relay box 14, the receptacle 16 receives the plug (not shown) on the air cond. power cord (not shown) and the plug 17 is mated with the electric wall socket (not shown).

Figure 3:
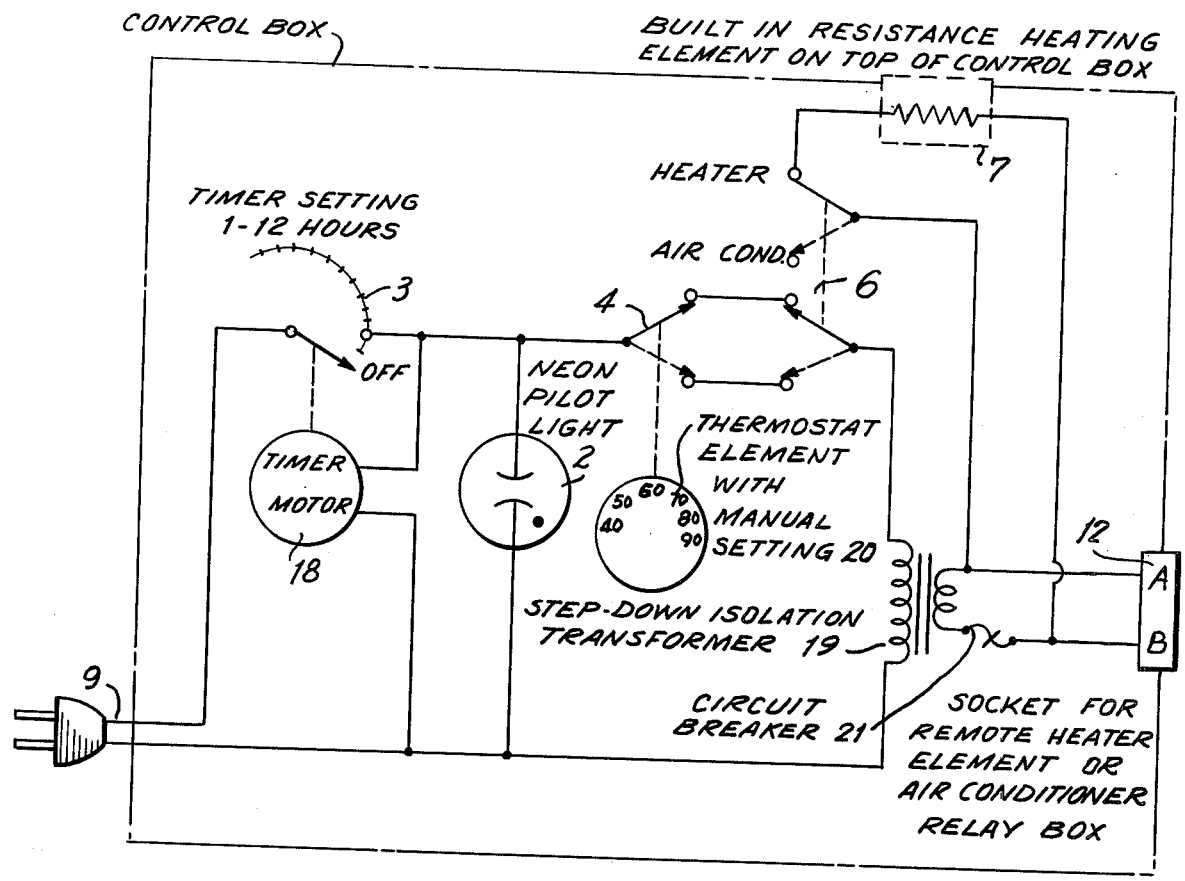
FIG. 3 is the electrical schematic diagram for FIG. 1.

FIG. 3 shows a timer motor 18 actuated by the setting of the timer control switch 3, actuating the neon pilot lite 2, and applies line voltage to the primary windings of a step-down isolation transformer 19 through the temperature control switch 4 as controlled by the thermostat element 20, and when the Heater-Air Cond. switch 6 is in the "Heater" position. The secondary winding of the transformer 19 supplies low-voltage to the built-in heating element 7, through the circuit breaker 21, and also to the auxiliary socket 12.

Figure 4:
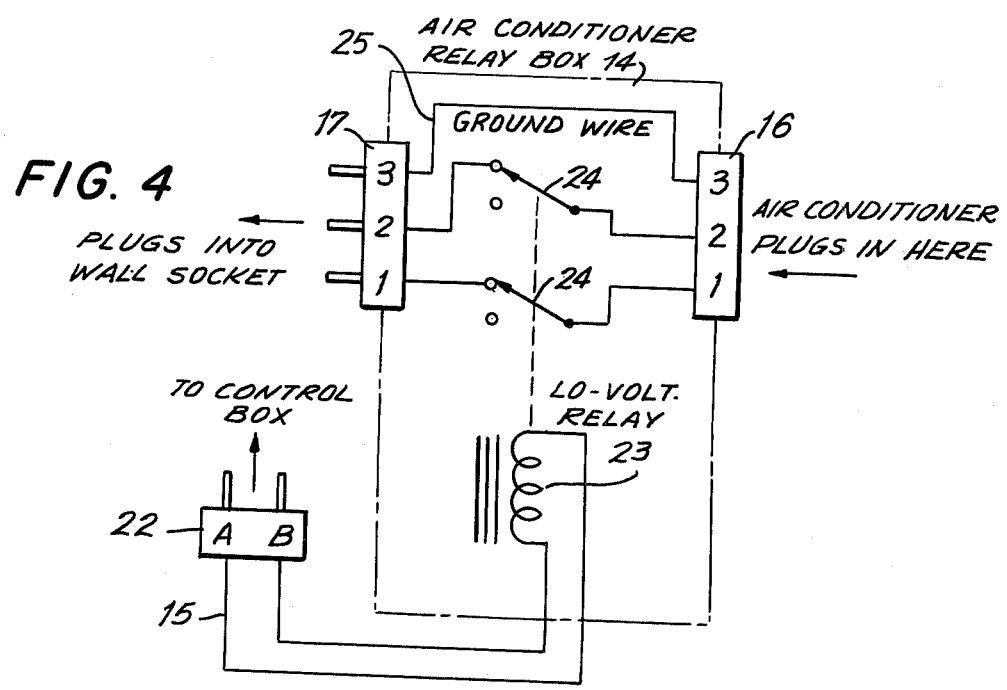
FIG. 4 is the electrical schematic diagram for FIG. 2, showing the relay in the de-energized or "Power Off" state.

FIG. 4 shows the air cond. relay box 14 containing the external plug 17, the receptacle 16, the interconnect cable 15 with plug 22, and low voltage relay 23 which actuates contacts 24. The ground wire 25 provides a grounding safety connection through the air cond. relay box 14.

DESCRIPTION OF THE PREFERRED EMBODIMENTS

A. The CONTROL BOX consists of (but is not limited to):

1. An electro-mechanical or electronic Timer, controlled by a knob on the face of the Control Box. The Timer is manually pre-set by the knob to control the time that the Control Box remains in operation. The timer knob automatically rotates back to the OFF position at the timer "run-out" rate, and indicates on the dial the remaining time left on that given operating cycle. The setting can be changed to any position during the operation of the device, as a means of manually increasing, decreasing, or terminating the time cycle.

2. An electro-mechanical or electronic Thermostat, controlled by a knob on the face of the Control Box. The Thermostat is manually set by the knob to establish the second temperature that will be controlled by the Control Box when it is in operation. This setting can be changed at any time during the operating cycle.

3. An electrically operated Pilot Lite (bulb) on the front panel of the Control Box. The Lite indicates when the Control Box is in the "operating" mode.

4. An internal low-voltage, resistance Heating Element, which, when actuated, and in close proximity beneath the building thermostat, will radiate sufficient heat to shut down the building thermostat.

5. An Indicating Thermometer of the mechanical, liquid, or electronic type, whose reading is visually presented on the front panel of the Control Box. The Thermometer will read "True Room Temperature" when the Control Box is in operation.

6. A step-down, isolation Transformer mounted inside the Control Box. The Transformer converts the incoming line voltage to a safer low-voltage, used to control an external Heating Element or Air Con. Relay Box. The Transformer also electrically isolates the line current from the external components, as a safety feature to minimize electric shock and fire hazards to the user or occupants.

7. An external electric Power Cord, wired into the Control Box, to connect ordinary line current to the Control Box.

8. A Circuit Breaker mounted within the Control Box, to provide electrical overload protection in the event of damage and short-circuits in the external Heating Element, Air Cond. Relay Box or Interconnect Cable.

9. A 2-pin Socket mounted on the side of the Control Box, to accept an external Interconnect Cable plug.

10. The outer Case, and various internal mechanical and electrical Hardware as necessary for conventional assembly of this type of product.

11. An optional Summer-Sleep Comfort Switch may be incorporated on the Control Box front panel, or supplied as a plug-in type switch module, on the side of the Control Box. The switch would by-pass the Control Box internal thermostat, thereby removing the voltage to the Air Cond. Relay Box when the Timer is operating. This allows the air conditioner(s) to remain on during the sleep period, and allows the Timer to shut-off the air conditioning at a pre-selected time before arising from bed.

B. The AUXILIARY HEATING ELEMENT consists of:

1. An internal low-voltage, resistance Heating Element, which is powered on or off by the Control Box. When actuated (and in close proximity beneath the building thermostat) the Heating Element radiates sufficient heat to cause the thermostat to shut down.

2. A variable-resistance electrical Potentiometer, readily adjustable (with screw-driver) on the front of the case at time of installation may be included. The adjustment establishes a proper heat level from the Heating Element, for positive "shut-down" of the building thermostat.

3. The protective Outer Case with ventilating louvres; the interconnect cable with plug; and internal mechanical and electrical assembly hardware and wiring.

C. The AIR CONDITIONER RELAY BOX consists of:

1. An internally mounted, low-voltage electrical Relay, powered on or off by the Control Box. When actuated, the Relay contacts "open", thereby breaking two power leads that pass through the Relay Box. This disconnects electrical power to the air conditioner that is plugged in to the Relay Box.

2. The protective Outer Case; fixed heavy-duty Plug and Socket for mating with the air-conditioner power cable and wall socket; an Interconnect Cable; and various mechanical and electrical assembly hardware and wiring.

Component Variations

The control Box is normally installed directly beneath the existing building thermostat. Multiple adapters may be added to accomodate several auxiliary Heating Elements, if needed.

The method of delivering heat from the device, out to the household Thermostat, can be varied at the discretion of the manufacturer. The heat can be channeled to the Thermostat through rigid or flexible tubing (rubber, plastic, etc.), using natural convection or forced air (using a miniature electric blower).

The Timer for the device can be selected to accomodate (internally or by external control) an automatic repeat cycle, to accomplish pre-programmed operation of the device over days, weeks, etc., and be capable of multiple time and temperature programs or modes of operation.

The Circuit Breaker in the Control Box can be of the automatic or manual reset-type or can be replaced with other means of providing electric over-load or short-circuit protection.

The Control Box Timer can be electro-mechanically configured to perform other functions in conjunction with, or separate from, the function of programming the heating and/or air conditioning time cycles. The manufacturer can provide additional contacts on the Timer; can add plug-in receptacles on the Control Box or Air Cond. Relay Box; etc. to enable use of the device to turn other appliances or fixtures on or off at pre-selected time intervals. Typical examples are, automatically turning on interior lights, radio, coffee pot, etc. before arising from bed (for convenience or as a wake up "alarm"); automatically turning on exterior, and/or interior house lights prior to arriving home during hours of darkness (as a personal safety feature); etc.

Example of Typical Installation and Operation

A. Installation:

1. For use in winter, the user installs the Control Box approximately one inch below the existing household or building thermostat, using simple mounting hardware supplied with the unit, and plugs the Control Box power cord into any convenient electrical outlet. The unit is then ready for normal operation. If an additional or remote thermostate in the building is to be controlled, the Auxiliary Heating Element is affixed beneath the remote thermostat, and the interconnect cable is plugged into the Control Box.

2. For use in summer, the Control Box can be located anywhere convenient to the user (e.g. on a wall or resting on a table). The Air Cond. Relay Box is then inserted between the plug-in type air conditioner power cord, and the wall receptacle. The interconnect cable from the Air Cond. Relay Box is then plugged into the Control Box. The unit is then ready to operate.

3. In winter use (controlling the building heating system), the Heater-Air Cond. Switch on the Control Box must be put in the "Heater" position. In summer use (controlling the air conditioner) the switch must be placed in the "Air Cond." position.

B. Typical Winter Operation:

Assume the following: a room temperature (and household Thermostat setting) in the dwelling, of 70°F.; an outdoor temperature of 40°; and the occupant plans to be away at work for 10 hours, and would like to let the dwelling temperature drop to 50° during his extended absence (to conserve heating fuel) and come back up to 70° just prior to his return to the dwelling. On the Control Box, he would set the Temperature knob to 50°, and set the Timer knob to 9 hours. He would keep his household Thermostat at the 70° setting, and leave for work. At the 9th hour after setting the Control Box Timer, the Control Box will shut-off and allow the household Thermostat to resume normal operation, causing the room temperature to go back up to 70°. If the room temperature has not built up to 70° by the time occupant returns at the 10th hour, he will know it takes more than 1 hour for his home heater to build the room temperature back up to 70°, from the 50 degree level. By observation, and trial and error, the user will be able to fairly judge the heating characteristics of his dwelling, and can then properly adjust the Control Box settings for maximum fuel savings and comfort.

Using this same technique, the user can use the device to set a cooler room temperature while sleeping, and have the room heat-up just prior to arising from bed.

A detailed description of the WINTER operating sequence is as follows (using the previous temperature conditions, for clarity): When the Timer knob is set to any hour setting past the OFF position, the Pilot Lite on the Control Box is actuated, and electric current is applied through the internal thermostat-contacts in the Control Box, out to the Heating Element. Heat radiated from the Heating Element will drive the household Thermostat to approximately 85° to 90°, shutting down the house heating system. The Heat Element remains actuated, until the room temperature drops below 50°, at which time the internal thermostat in the Control Box cuts off current to the Heating Element and allows it to cool off. Without this heat radiated from the Heating Element, the household Thermostat will sense that the actual room temperature (50°) is below the household Thermostat setting of 70°, and will turn on the house heat. When the room heats up past the 50° level, the internal thermostat in the Control Box again applies current to the Heating Element, pushing the household Thermostat back up above 85°, and turning off the house heat again. This cycle continually repeats itself for the duration of time set by the Timer knob, thereby maintaining a room temperature of approx. 50° for that duration. When the Timer shuts off at the pre-selected time, the Timer contacts disconnect the electric current to the Pilot Lite, the internal thermostat in the Control Box, and the Heating Element; thereby in effect disconnecting the device from the household heating system and allowing that system to function as "normal". The device remains ready to be reused again when and as desired. When the device is operating, the user should read "True Room Temperature" on the Control Box panel, and disregard the readings on the household Thermostat.

C. Typical Summer Operation:

The Heater-Air Cond. switch on the Control Box will be placed in the "Air Cond." position, and the Air Conditioner Relay Box connected to the Control Box (as described in the INSTALLATION section (A) (3) above. Assume the following: an outdoor temperature of 100° F.; an indoor temperature of 70° is maintained by an operating room-air-conditioner; and the occupant plans to be away at work for 10 hours, and would like to have the air conditioner in-operative until the outdoor summer heat pushes the indoor room temperature up to 90°, and to come on only as necessary to keep the room temperature from going above 90° (to conserve electric power and prevent possible excess heat damage to contents of the house); and would want the room cooled back to 70° just prior to his return to the dwelling. To accomplish this, he would leave his air conditioner on; then set the Control Box Temperature knob to 90°, and the Timer knob to 9 hours, and leave for work. On the 9th hour after setting the Control Box Timer, the Control Box will shut-off, allowing the air conditioner to resume normal operation and cool the room to 70°. If the room has not yet cooled down to 70° by the time he returns at the 10th hour, he will know it requires more than 1 hour for the air conditioner to cool the room back down to 70° from the 90° level. By observation, and trial and error, he will acquire the ability to select the best Control Box settings for maximum electric power savings and comfort.

A detailed description of the SUMMER operating sequence is as follows (using the previous Summer temperature conditions as outlined in the previous paragraph): When the Timer knob is set to any hour setting past the OFF position, the Pilot Lite bulb is actuated, and electric current is applied through the Control Box internal thermostat contacts, out to the electric relay in the Air Cond. Relay Box. The relay then actuates, opening its contacts, and breaks the electric current to the air conditioner, shutting it off. The relay remains activated, keeping the air conditioner shut off, until the room temperature climbs upward (because of the outdoor Summer heat) until it reaches 90°. If the room temperature does not reach 90° during the time span set on the Timer the air conditioner will not come on at all, until the Timer shuts off, cutting power to the Air Cond. Relay Box, which in turn allows the air conditioner to resume normal operation. If the room temperature reaches 90°, the Control Box internal thermostat contacts will open, thereby cutting off power to the Air Cond. Relay Box, and allowing the air conditioner to come back on. The air conditioner will gradually push the room temperature down below 90°, at which time the Control Box internal thermostat contacts will again close, supplying current to the Air Cond. Relay Box, and shutting off the air conditioner. This cycle will continue for the duration of time set by the Timer knob, keeping the room temperature at or below 90° for that period. When the Timer shuts off at the pre-selected time, the Timer contacts disconnect the electric current to the Pilot Lite, the internal thermostat in the Control Box, and the Air Cond. Relay Box; thereby in effect disconnecting the device from the air conditioner, and allowing the air conditioner to function as "normal". The Control Box remains ready to be reset again, and utilized when and as desired.

If the "Summer-Sleep Comfort Switch" is incorporated (as a switch on the Control Box, or as an optical plug-in module external to the Control Box), an additional Summer comfort feature is provided. When the comfort switch is turned on when going to bed, the air conditioner will stay on (room temperature controlled by setting on air conditioner) during the sleep period, and the Timer will shut the air conditioner totally off at a pre-selected time before arising, regardless of the Temperature setting on the Control Box. This is accomplished as follows: When the comfort switch is placed in the ON position, the switch contacts electrically "jumper" the Control Box internal thermostat contacts, and by-pass the thermostat function by keeping the relay in the Air Cond. Relay Box hooked up at all times that the comfort switch is in the ON position. In the ON position, a second set of contacts in the switch opens the primary winding of the transformer in the Control Box (when the Timer is turned on and running), and prevents current from reaching the Air Cond. Relay Box, thereby keeping the air conditioner running normal. When the Timer shuts off, a contact on the Timer supplies current through the second set of contacts on the comfort switch, that enables electric current to reach the Air Cond. Relay Box (through the Control Box internal transformer and by-passed thermostat contacts), thereby shutting down the air conditioner. It is necessary for the user to "turn-off" the comfort switch after arising from bed, in order to return his air conditioner to its "normal" operation. If he leaves the comfort switch ON, and turns on the Timer, the air conditioner will resume operation for the time interval set on the Timer, and will shut down again when the Timer shuts down, or is rotated back to the OFF position.

I claim:

1. A dual temperature thermostatic controller for selectively controlling a heating system or an air-conditioning system in a building interior comprising, in the heating mode,
  a. a first thermostat electrically connected to said heating system and set to maintain a first temperature in said building interior;
  b. an electric heating element located in sufficient proximity to said first thermostat so as to effect a rise in the temperature of said first thermostat, without significantly increasing the ambient air temperature in said building interior;
  c. a second thermostat being connected so as to actuate said electric heating element when said second thermostat is set to a lower temperature than said first temperature; and
  d. a timer electrically connected to said second thermostat during a set period of time so that said electric heating element is only operated by said second thermostat during said set period of time thereby causing said first thermostat to be turned on or off during said set period of time, as controlled, thus maintaining said lower temperature in said building interior; and in the air-conditioning mode,
  e. a relay box electrically connected between said air-conditioning system and said second thermostat, such that said relay box is actuated by said second thermostat causing the electric power to be disconnected from said air conditioning system when the building interior temperature is below the temperature set on said second thermostat.

2. A dual temperature thermostatic controller according to claim 1 wherein said second thermostat, said timer, and said electric heating element are physically combined in one casing.

3. A dual temperature thermostatic controller according to claim 1 wherein said electric heating element is remotely positioned from said second thermostat by means of an interconnect cable.

* * * * *